April 6, 1948. G. B. DU BOIS 2,439,161
ATTACHING MEANS
Filed Oct. 9, 1946
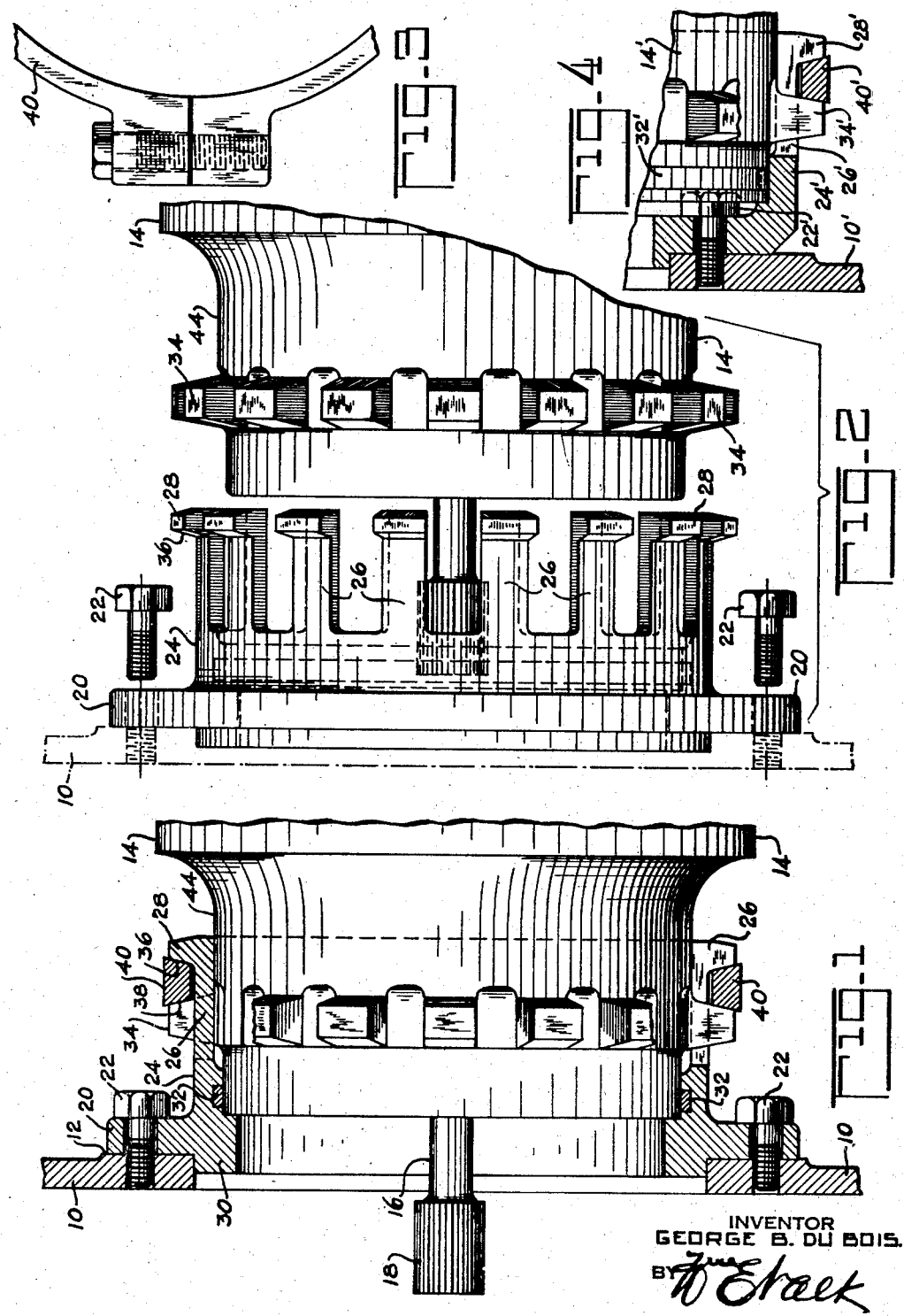
INVENTOR
GEORGE B. DU BOIS.
BY
ATTORNEY Patented Apr. 6, 1948

2,439,161

UNITED STATES PATENT OFFICE 2,439,161

ATTACHING MEANS

George B. Du Bois, Radburn, N. J., assignor to Wright Aeronautical Corporation, a corporation of New York Application October 9, 1946, Serial No. 702,279

7 Claims. (Cl. 285—129)

This invention relates to engine accessories and is particularly directed to the provision of means for mounting various engine accessories on the engine.

In aircraft engines, accessories—such as oil and fuel pumps, magnetos, generators, starters, etc.—are generally mounted directly on the engine. For this purpose, the engine crankcase is provided with an annular mounting pad or surface and the engine accessory is provided with an annular flange arranged to be secured against the surface or pad on the crankcase by means of a plurality of circumferentially spaced bolts or screws passing through the accessory flange. Removal or application of all the mounting bolts for an engine accessory takes considerable time, particularly because of the compact construction of an aircraft engine.

An object of this invention is the provision of an accessory mounting construction whereby the accessory may be quickly mounted by tightening one bolt. A further object of this invention comprises an accessory mounting construction such that the accessory may be supported from the conventional mounting pads or surfaces generally provided on aircraft engines for this purpose. Specifically, the invention comprises an adapter ring which is bolted to the engine mounting pad or surface, the accessory in turn being rigidly supported from this ring in a novel manner permitting quick mounting and removal of the accessory from the ring.

Other objects of the invention will become apparent upon reading the annexed detailed description in connection with the drawing in which:

Figure 1 is a sectional view illustrating the accessory mounting construction of the present invention;

Figure 2 is an exploded view of the accessory and adapter ring;

Figure 3 is a sectional view of a portion of the clamping ring; and

Figure 4 is a modified form of the invention.

Referring to the drawing, 10 indicates a fragmentary portion of an engine crankcase having a mounting surface 12 for an engine accessory 14 such as an engine driven pump, magneto, generator, starter, etc. The accessory is provided with a drive shaft 16 arranged to extend within the engine crankcase and having a splined end 18 adapted to be drivably connected to the engine. An adapter ring 20 is secured to the crankcase 10 on the mounting surface 12 by a plurality of circumferentially spaced bolts 22.

The adapter ring 20 is provided with a cylindrical extension 24 and, as illustrated, the bolts 22 are disposed outside this cylindrical extension. Obviously, however, the cylindrical extension 24 may be disposed outside the bolts 22, as illustrated in Figure 4. Figure 4 is otherwise similar to Figures 1 to 3 and like parts have been indicated by like, but primed, reference numerals. Accordingly, no further description of Figure 4 appears necessary.

The end of the cylindrical extension 24, remote from the engine crankcase, is slotted to provide axially extending fingers 26. Each of the fingers 26 is formed with a lug or outwardly directed flange 28 at its free end.

The accessory 14 is arranged to be received within the cylindrical extension 24 against a shoulder 30, a suitable seal or packing 32 preferably being provided between the accessory and the cylindrical extension 24. The outer surface of the accessory is provided with a plurality of circumferentially spaced lugs 34 adapted to be received between the fingers 26, the lugs 34 extending radially outwardly beyond the fingers 26 and being axially spaced from the lugs 28 as illustrated. The adjacent sides of the lugs 28 and 34 are beveled as indicated at 36 and 38 respectively.

A clamp ring 40, having beveled inwardly converging sides, is arranged to be tightened by a bolt 42 in the annular space between the alternate lugs 28 and 34. The wedging action of the clamp ring 40 between the beveled sides 36 and 38 of the lugs 28 and 34 forces the inner end of the accessory 14 against the shoulder 30 thereby securing the accessory to the adapter ring 20. The accessory housing preferably is provided with a machined surface 44 against which the fingers 26 bear thereby preventing bending of the fingers by the clamping action of the ring 40. Also, the inner end of the accessory housing preferably is piloted within the cylindrical extension 24.

The clamp ring 40 may be a one piece split ring having sufficient resiliency to permit it to be spread over the lugs 28 or 34 for assembly. As an alternate construction, the ring 40 may have a hinged or bolted joint diametrically opposite to the clamping bolt 40.

With the aforedescribed construction, the accessory may be removed simply by loosening the single bolt 42. Similarly, the accessory may be quickly secured in place by tightening the single bolt 42. The adapter ring 20 remains bolted to the engine when an accessory is replaced or removed. Also, the adapter ring can be removed quite readily because the accessory is first removed, thereby providing easy access to the bolts 22. In addition, the present invention provides an accessory mounting construction which, without any change in the existing engine crankcase, permits the accessory to be quickly changed or replaced, the adapter ring 20 being secured to the conventional engine crankcase mounting pad or surface.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A mounting construction for an engine accessory member, said construction comprising a sleeve member adapted to be secured to the engine, one of said members being slotted at its end adjacent the other of said members to provide circumferentially spaced fingers, lugs projecting radially outwardly from said fingers providing a first set of lugs, a second set of circumferentially spaced lugs on the other of said members arranged to be received between and to extend radially outwardly beyond said fingers, said sets of lugs being adapted to be axially spaced with the first set of lugs disposed closer to the free ends of said fingers than the second set of lugs, and a ring adapted to be tightened about said members between said sets of lugs.

2. A mounting construction for an engine accessory member, said construction comprising a sleeve member adapted to be secured to the engine, one of said members being slotted at its end adjacent the other of said members to provide circumferentially spaced fingers, lugs projecting radially outwardly from said fingers providing a first set of lugs, a second set of circumferentially spaced lugs on the other of said members arranged to be received between and to extend radially outwardly beyond said fingers, said sets of lugs being adapted to be axially spaced with the first set of lugs disposed closer to the free ends of said fingers than the second set of lugs, and a ring adapted to be tightened about said members between said sets of lugs, said ring having beveled inwardly converging sides and the sides of said lugs arranged for engagement with said ring having a corresponding bevel.

3. An engine accessory mounting construction comprising a sleeve adapted to be secured to the engine, said sleeve being slotted at its end remote from said engine to provide circumferentially spaced fingers, lugs projecting radially outwardly from said fingers to provide a first set of lugs, a second set of circumferentially spaced lugs on the accessory arranged to be received between and to extend radially outwardly beyond said fingers, said sets of lugs being adapted to be axially spaced with the first set of lugs disposed closer to the free ends of said fingers than the second set of lugs, and a ring adapted to be tightened about said sleeve and accessory between said sets of lugs.

4. An engine accessory mounting construction comprising a sleeve adapted to be secured to the engine, said sleeve being slotted at its end remote from said engine to provide circumferentially spaced fingers, lugs projecting radially outwardly from said fingers to provide a first set of lugs, a second set of circumferentially spaced lugs on the accessory arranged to be received between and to extend radially outwardly beyond said fingers, said sets of lugs being adapted to be axially spaced with the first set of lugs disposed closer to the free ends of said fingers than the second set of lugs, and a ring adapted to be tightened about said sleeve and accessory between said sets of lugs, a shoulder on said cylindrical extension against which said accessory is urged by the wedging action of said ring.

5. An engine accessory mounting construction comprising a sleeve adapted to be secured to the engine, said sleeve being slotted at its end remote from said engine to provide circumferentially spaced fingers, lugs projecting radially outwardly from said fingers to provide a first set of lugs, a second set of circumferentially spaced lugs on the accessory arranged to be received between and to extend radially outwardly beyond said fingers, said sets of lugs being adapted to be axially spaced with the first set of lugs disposed closer to the free ends of said fingers than the second set of lugs, and a ring adapted to be tightened about said sleeve and accessory between said sets of lugs, a shoulder on said cylindrical extension against which said accessory is urged by the wedging action of said ring, said accessory being provided with an outer surface for supporting said fingers.

6. An engine accessory mounting construction comprising a sleeve adapted to be secured to the engine, said sleeve being slotted at its end remote from said engine to provide circumferentially spaced fingers, lugs projecting radially outwardly from said fingers to provide a first set of lugs, a second set of circumferentially spaced lugs on the accessory arranged to be received between and to extend radially outwardly beyond said fingers, said sets of lugs being adapted to be axially spaced with the first set of lugs disposed closer to the free ends of said fingers than the second set of lugs, and a ring adapted to be tightened about said sleeve and accessory between said sets of lugs, a shoulder on said cylindrical extension against which said accessory is urged by the wedging action of said ring, said accessory being provided with an outer surface for supporting said fingers, the inner end of said accessory being piloted within said sleeve.

7. An engine accessory mounting construction comprising a sleeve adapted to be secured to the engine, said sleeve being slotted at its end remote from said engine to provide circumferentially spaced fingers, lugs projecting radially outwardly from said fingers to provide a first set of lugs, a second set of circumferentially spaced lugs on the accessory arranged to be received between and to extend radially outwardly beyond said fingers, said sets of lugs being adapted to be axially spaced with the first set of lugs disposed closer to the free ends of said fingers than the second set of lugs, and a ring adapted to be tightened about said sleeve and accessory between said sets of lugs, said ring having beveled inwardly converging sides and the sides of said lugs arranged for engagement with said ring having a corresponding bevel.

GEORGE B. DU BOIS.